(12) United States Patent
Eschbach et al.

(10) Patent No.: US 7,589,865 B2
(45) Date of Patent: Sep. 15, 2009

(54) VARIABLE DIFFERENTIAL GLOSS FONT IMAGE DATA

(75) Inventors: Reiner Eschbach, Webster, NY (US);
James R. Low, Rochester, NY (US);
William A. Fuss, Rochester, NY (US);
Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 854 days.

(21) Appl. No.: 11/313,397

(22) Filed: Dec. 21, 2005

(65) Prior Publication Data

US 2007/0139680 A1 Jun. 21, 2007

(51) Int. Cl.
*H04N 1/405* (2006.01)
*H04N 1/393* (2006.01)
*B41M 3/10* (2006.01)

(52) U.S. Cl. .................. 358/1.9; 358/3.06; 358/3.2; 358/3.28; 358/1.2; 358/1.11

(58) Field of Classification Search .................. 358/1.9, 358/3.06, 3.13, 3.2, 3.27, 3.28, 534, 536, 358/1.11, 1.2, 451; 382/237, 270, 298, 299; 283/91, 93, 113
See application file for complete search history.

(56) References Cited

U.S. PATENT DOCUMENTS

| | | | | |
|---|---|---|---|---|
| 5,847,713 A | * | 12/1998 | Ueda | ................... 358/1.11 |
| 7,092,128 B2 | * | 8/2006 | Wang et al. | ................. 358/3.06 |
| 7,126,721 B2 | * | 10/2006 | Wang et al. | ................. 358/3.06 |
| 7,324,241 B2 | * | 1/2008 | Eschbach et al. | ............. 358/1.9 |
| 2003/0231349 A1 | | 12/2003 | Wang et al. | |
| 2004/0000786 A1 | | 1/2004 | Xu et al. | |
| 2004/0001233 A1 | | 1/2004 | Wang et al. | |
| 2004/0156078 A1 | | 8/2004 | Wang et al. | |
| 2007/0139681 A1 | * | 6/2007 | Eschbach et al. | ........... 358/1.11 |

OTHER PUBLICATIONS

Reiner Eschbach et al., U.S. Appl. No. 11/314,509, filed Dec. 21, 2005 entitled "Printed Visible Fonts with Attendant Background".
James R. Low et al., U.S. Appl. No. 10/954,125, filed Sep. 29, 2004, entitled "Variable Data Differential Gloss Images".

\* cited by examiner

*Primary Examiner*—Scott A Rogers
(74) *Attorney, Agent, or Firm*—Fay Sharpe LLP

(57) ABSTRACT

The present invention relates to the expedient supply of differential gloss text into a document image, particularly as when desired in the employ of rendering variable data. A font character is selected and sub-sampled. The sub-sampled result is then scaled up into a full size result. A first halftone cell having a first anisotropic structure orientation is selected and applied to the full size scaled font result while a second halftone cell having a second anisotropic structure orientation is applied to the surrounding background around the full size scaled font result to create a gloss font character. This full gloss font character is then stored as a font representation as callable by the digital front end of a printing apparatus.

26 Claims, 8 Drawing Sheets

VARIABLE DIFFERENTIAL GLOSS FONT IMAGE DATA

CROSS-REFERENCE TO RELATED APPLICATIONS

Cross reference is made to the following application filed concurrently herewith and incorporated by reference herein: Ser. No. 11/314,509 entitled "PRINTED VISIBLE FONTS WITH ATTENDANT BACKGROUND".

Cross reference is made in particular to the following application: patent application Ser. No. 10/954,125, entitled "VARIABLE DATA DIFFERENTIAL GLOSS IMAGES" to inventors James R. Low, Reiner Eschbach, Zhigang Fan, William Fuss, and Shen-ge Wang, the disclosure of which is totally incorporated by reference. Further cross reference is made to the following applications, the disclosures of each of which are totally incorporated by reference herein: U.S. Patent Publication No. 2004/0156078, entitled "APPLICATION OF GLOSSMARKS FOR GRAPHICS ENHANCEMENT" to inventors Shen-ge Wang, Beilei Xu, and Chu-heng Liu; U.S. Patent Publication No. 2003/0231349, entitled "HALFTONE IMAGE GLOSS CONTROL FOR GLOSSMARKS", to inventors Shen-ge Wang, Beilei Xu, and Chu-heng Liu; U.S. Patent Publication No. 2004/0000786, entitled "VARIABLE GLOSSMARK" to inventors Beilei Xu, Shen-ge Wang, and Chu-heng Liu; and U.S. Patent Publication No. 2004/0001233, entitled "PROTECTING PRINTED ITEMS INTENDED FOR PUBLIC EXCHANGE WITH GLOSSMARKS" to inventors Shen-ge Wang, Beilei Xu, and Chu-heng Liu. The appropriate components and processes of the above co-pending applications may be selected for the invention of the present application in embodiments thereof.

BACKGROUND AND SUMMARY

The present invention in various embodiments relates generally the gloss inherent in the hardcopy text or text/like objects. More particularly, this invention relates to halftoned image data and the control of differential gloss when that halftone image data is printed into hardcopy. This invention further relates to the design of a font where the characters, symbols and other font elements are recognizable predominantly by gloss differentiation.

It is desirable to have a way to protect against the copying of a document. Most desirably in a manner so that part of the content can be readily observed by a human reader but not by a copier scanner. It is desirable that such a solution also have a minimum impact in its digital processing overhead requirements as well as minimizing any storage requirements. Additionally, it is highly desirable that this solution can be obtained without physical modification to the printing device and without the need for special materials and media.

There has been a need for a printer that can print a page that can be read but not copied. One approach is where a text string is printed using clear toner or ink, creating a difference in reflected light and diffused light that can be discerned by a human reader by holding the paper at an angle, but can not typically be detected by a copier scanner which is restricted to reading at fixed angles to the page. Such an approach provides a gloss image of the font string. Unfortunately, this approach requires clear toner or ink.

Another method, described in U.S. Pat. Nos. 4,210,346 and 5,695,220, is to use a particular white toner and a particular white paper that are designed to have different diffused light characteristics at different angles. Of course, this system requires special, matched paper and toner.

In U.S. Pat. No. 6,108,512 to Hanna, there is illustrated, for example, a system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a right angle. In this case, the diffused light is approximately equal for both toned and untoned surfaces, the scanner will detect no difference and the copier will not be able to copy the original. Here again, special material is required.

Another approach taken to provide a document for which copy control is provided includes digital watermarking. As an example in U.S. Pat. No. 5,734,752 to Knox, there is illustrated a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

For each of the above patents and citations the disclosures therein are totally incorporated herein by reference in their entirety.

As disclosed in U.S. Patent Publication No. 2003/0231349 entitled "HALFTONE IMAGE GLOSS CONTROL FOR GLOSSMARKS", to inventors Shen-ge Wang, Beilei Xu, and Chu-heng Liu (cross referenced and incorporated above), there is provided an arrangement and methodology which will control gloss and allow manipulation for Glossmark™ differential gloss images without requiring special toners/inks or paper/substrates, nor require the superimposition of additional prints to allow viewing. However, with such an arrangement and methodology, there is inherent a requirement for additional electronic processing beyond that otherwise normally needed. There may also be increased storage requirements entailed as well. A typical scenario for variable data is in the area of mass mailing where mail fliers are personalized "on-the-fly" with variable data inserted into provided fields in the document as the document is hardcopy printed. As will be well understood by those skilled in the art any undo image data processing overhead would unacceptably impact the printing process. It would therefore be desirable to minimize the impact of such required additional electronic processing with a variant providing a further improved methodology for the manipulation of inherent differential gloss.

As further disclosed in U.S. Patent Publication No. 2004/0000786 entitled "VARIABLE GLOSSMARK", to inventors Shen-ge Wang, Beilei Xu, and Chu-heng Liu (cross referenced and incorporated above), there is provided an arrangement and methodology which relates to the segmentation of an image into a main area and a image segment for the sake of providing variable Glossmark™ differential gloss image data. By selectively applying halftones with anisotropic structure characteristics which are significantly different in orientation while remaining identical in density to the image segment, a variable Glossmark™ differential gloss image may be superimposed within an image with reduced processing and storage requirements. However, the basic creation of variable data Glossmark™ differential gloss image areas in a hardcopy page (as well as correlation marks in general) must start by combining a primary image with a desired variable image data provided as required in a Glossmark™ differential gloss image scenario as binary mask data. In the portions of the image selected by the binary mask data one halftone screen is used. In other portions of the image an alternate halftone screen is used. Thus, it follows that two data channels need to be combined where one data channel controls the halftone fine structure and the other data channel delivers the image content. In standard DFEs (digital front-ends), as provided in copiers, printers, multifunction devices, or digital presses, these channels are simply not available—nor is IOT (image output terminal) access for the halftoning commonly accessible at this level—so that the complete Glossmark™ differential gloss image or other correlation mark must be created off-line and inserted. This effectively impedes the ability for creation of Variable Data Glossmark™ differential gloss images, particularly on-the-fly in a digital press mass mailing scenario, since all images must be computed externally. This causes several problems in data flow, data handling, and data bandwidth particularly for variable data systems. Described herein below is an approach for solving this problem.

Disclosed in embodiments herein, is a method for variable data differential gloss font control. The method comprises segmenting each font element into two areas and incorporating a anisotropic structure to each of the two areas, where the two anisotropic structures are predominantly orthogonal to each other.

Further disclosed in embodiments herein, is a method for variable data differential gloss font control comprising the design of a font whose elements are predominantly recognizable by varying gloss, rendering all characters/symbols in the described manner and encapsulating the rendered elements into a new derivative gloss font. A font format that is efficiently handled by a DFE (Digital Front End) such as DocuSP® and using said font in a variable data application such as VIPP® (Variable Data Intelligence Postscript Printware).

Further disclosed in embodiments herein, is a method for variable data differential gloss image control comprising segmenting the creation of a font encapsulating the different characters/symbols predominantly as gloss differences. The method comprising rendering a rectangular field area with one of two anisotropic halftone structures, using a predetermined gray level, rendering into this rectangle at identical gray level a character/symbol using a second halftone structure at different angle from said first structure. The method further comprising encapsulating the rendered rectangle as part of a new gloss font. The method finally comprising using the so created gloss font as font in a document production system, preferably a variable data document production system.

Further disclosed in embodiments herein, is a method for a variable data differential gloss font image comprising, selecting a font character, sub-sampling that selected font character into a sub-sample result and scaling that sub-sample result back up to a desired full size result. Selection is made of a first halftone cell having a first anisotropic structure orientation and a second halftone cell having a second anisotropic structure orientation. The first halftone cell is applied to the desired full size result and the second halftone cell is applied to the background field for the desired full size result to produce a variable data differential gloss font image.

Further disclosed in embodiments herein, is a method for generating a variable text data differential gloss font image set comprising, selecting a font character and rasterizing that selected font character into a bit-mapped sub-sample result. This sub-sample result is scaled back up to a desired full size bitmap result having a bit pattern defined therein. Selection is made of a first halftone cell having a first anisotropic structure orientation and a second halftone cell having a second anisotropic structure orientation. A background field area suitable for encompassing the selected font character is selected as well. The selected first halftone cell and the second halftone cell are applied to the selected background field area, toggling between the selected first and second halftone cells as dictated by the bit pattern in the desired full size bitmap result to create a differential gloss font character image. The differential gloss font character image thus created is stored for utilization as system font.

DETAILED DESCRIPTION

Figure 11:
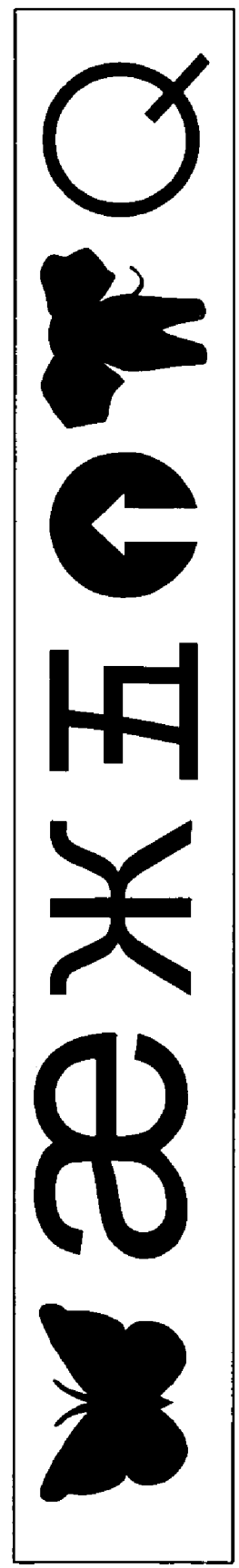
FIG. 11 depicts "wing-dings" considered to be within that set of items defined as font characters.

Disclosed herein, is a method for variable data differential gloss image control comprising designing a special font which when displayed on a monitor or other device not capable of rendering differential gloss images will simply result in a basic color patch, but when suitably rendered in hardcopy will reveal discernable text in the reflected gloss of that hardcopy. Here and in the description which follows, we will use the term "font" to indicate the Page Description Language (PDL) concept of a font, where the font can contain standard ASCII characters, but also other characters, e.g. Kanji, symbols, small icons, lines, bar codes and other elements that are commonly represented in a binary state modus. When referring to strings created using said fonts, concatenated symbols and other elements are also explicitly included. FIG. 11 shows a set of elements that are typically included as standard in a font set description. Also, when referring to a color or simple color in the subsequent text, we will assume that the font has an associated font color, upon which the standard color operations can be performed. This means that in most cases the font will have but a single color, though in some cases the font will have several colors, and in a few cases a complex color pattern, such as image field color.

By proper utilization of the perceived differential gloss inherent between various anisotropic halftone dot structures, the desired manipulation of perceived gloss and the generation of Glossmark™ differential gloss text images via that gloss differential may be achieved without the need for special paper or special toners or inks. By further application of the font representation techniques which are described below, these differential gloss text images maybe employed in variable data system as a differential gloss font without undo impact to the throughput of those systems.

Figure 1:
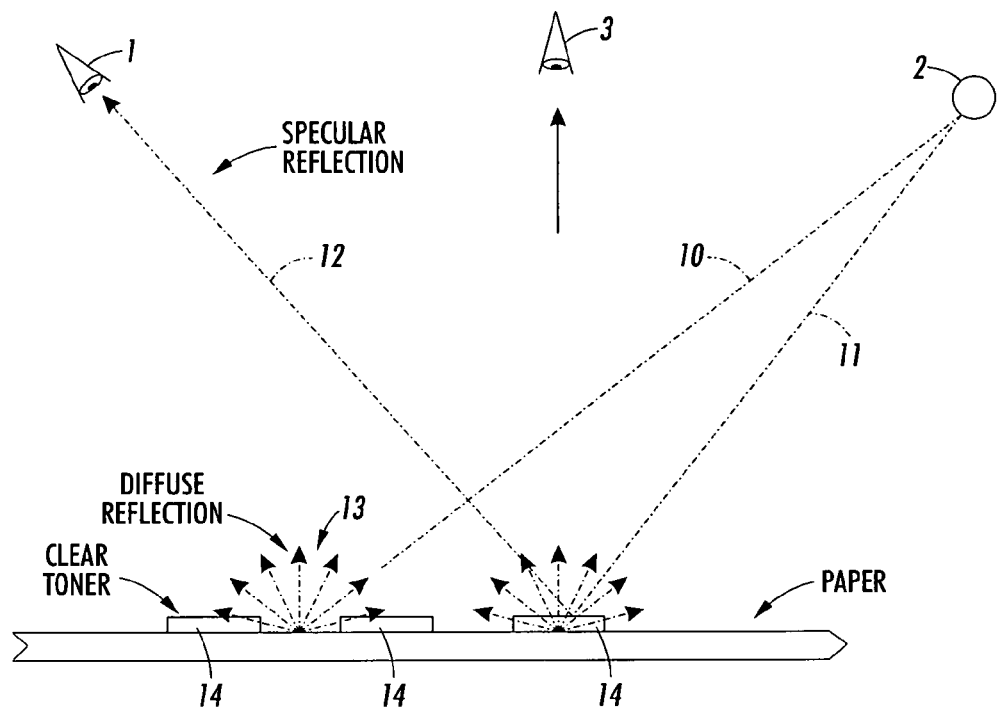
FIG. 1 shows how the human eye can detect a large difference between the glossy portions of the page but a scanner detector cannot.

FIG. 1 shows how the human eye 1 can read gloss upon the page and a scanner cannot. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner 3 reads incident light at right angles to the paper. In this case, there is only a small amount of diffused light coming from both the glossy and non-glossy dots, and the scanner can not detect a difference. This is one manner for creating a gloss image which cannot be scanned by conventional copiers and scanners.

Figure 2:
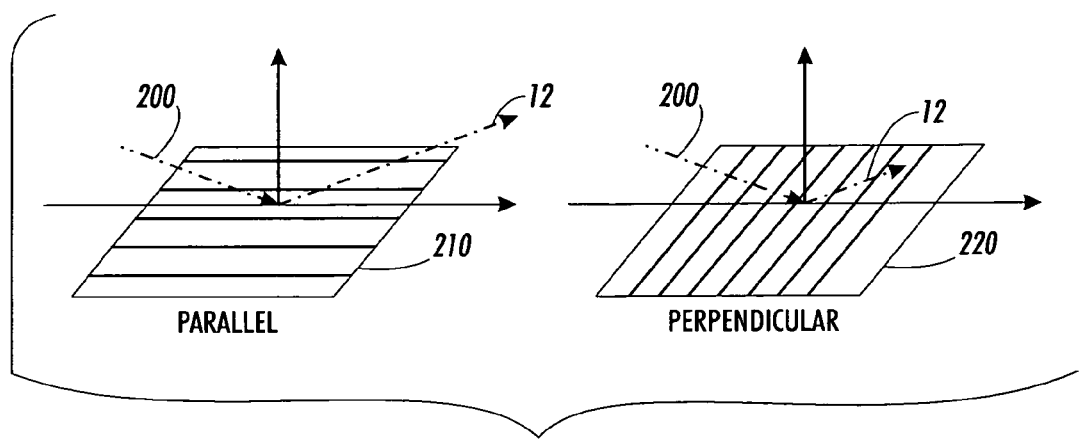
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which the inherent gloss is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to impinging incident light 200, a parallel orientation 210, and a perpendicular orientation 220. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a Glossmark™ differential gloss image. The perceptibility of this gloss differential will be maximized when the halftone anisotropic orientations are 90 degrees apart as shown here in FIG. 2.

Figure 3:
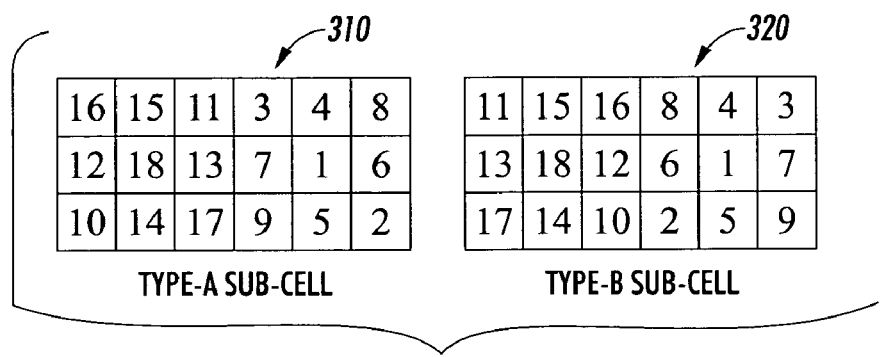
FIG. 3 shows two 3×6 halftone patterns suitable in anisotropic structure to produce discernable gloss differential for practicing the present invention.
Figure 4:
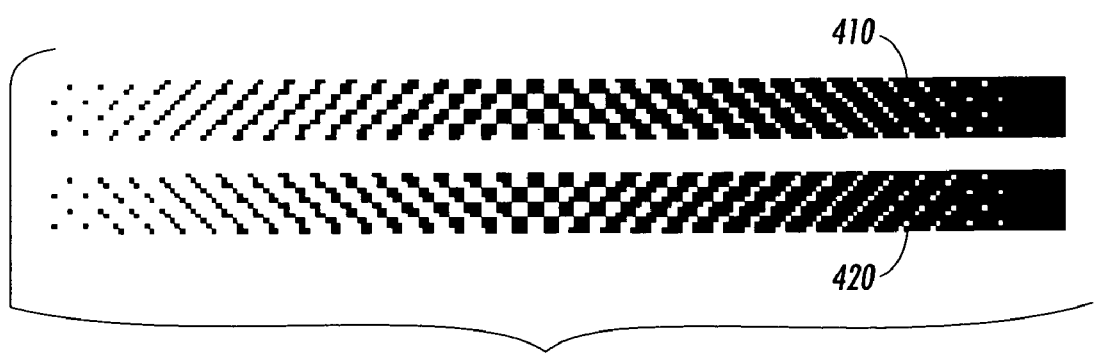
FIG. 4 is a density sweep of the two halftone patterns of FIG. 3.

FIG. 3 shows example halftone cells suitable for a skilled practitioner to employ in one possible embodiment employing the teachings of the present invention. They are but one useful example as will be evident to those skilled in the art. Each halftone cell here is comprised as a three by six pixel array (8×4, 8×8 and 32×4 are other examples) chosen as a simple example for illustrative teaching. In a preferred embodiment, the cell structure will be influenced by subsequent processing steps in the DFE. For example, a DFE using block based compression for data communication will work most favorably with a cell structure that reflects such a block structure. In such a system the preferred cell structure might bear a simple relationship to the 8×8 block size commonly used in block based compression. The turn on/off sequence for the simple example is numerically indicated in FIG. 3. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other. Smaller angle differences will lead to a reduced gloss differential which might be desirable in some applications.

Figure 5:
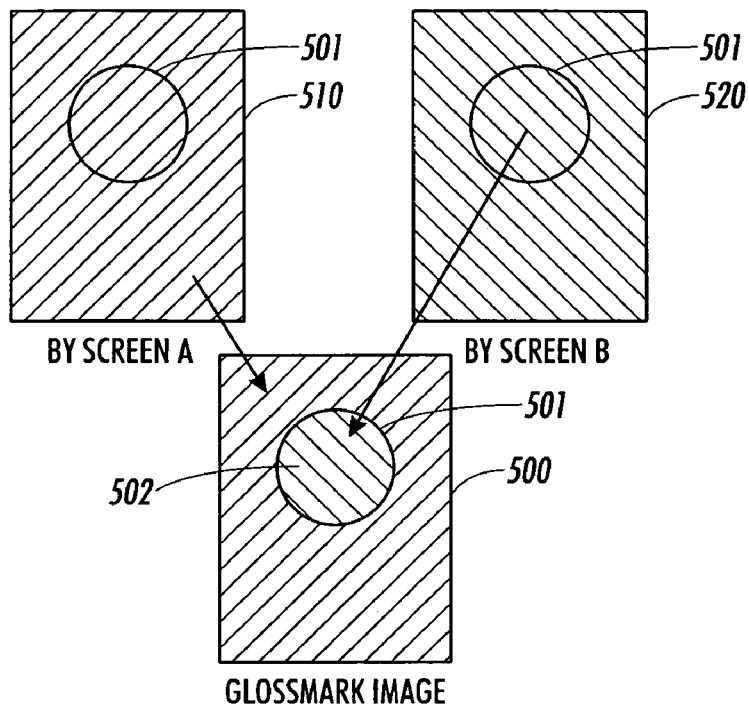
FIG. 5 depicts a patchwork alternating of the two halftone patterns of FIG. 3 so as to achieve a Glossmark™ differential gloss image.

FIG. 5 schematically depicts a Glossmark™ differential gloss image 500 achievable using halftone cells as described above. Screen-A 510 uses one halftone cell type and screen-B 520 uses the other. The circle 501 is provided as a visual aid across the image screens 500, 510 and 520. The desired Glossmark™ differential gloss image here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patch-worked together to create the Glossmark™ differential gloss image 500.

Figure 6:
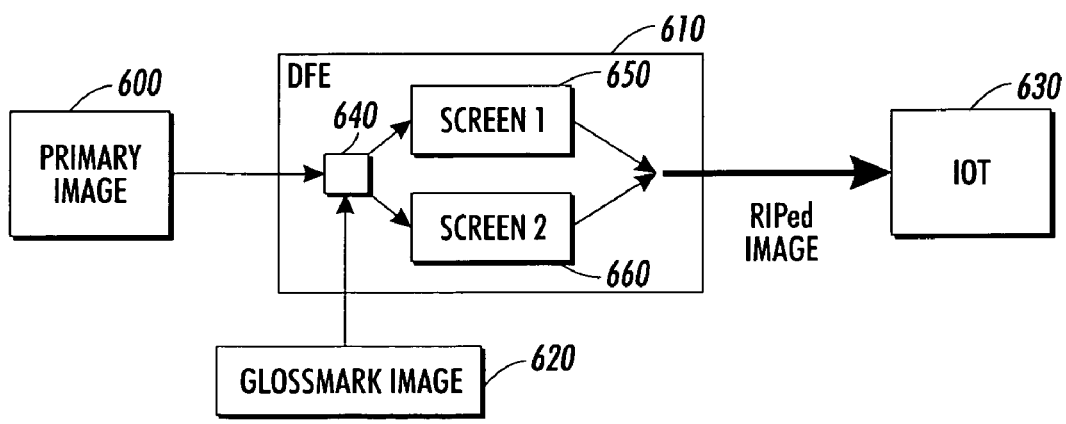
FIG. 6 shows one embodiment for achieving the image directed alternation of the halftone patterns for Glossmark™ differential gloss images as depicted in FIG. 5, utilizing the halftone patterns of FIG. 3.

Another approach for the assembly of a Glossmark™ differential gloss image is diagramed in FIG. 6. Here, the primary image 600 is received as input data to the digital front-end (DFE) 610 as is normal. However, a desired Glossmark™ differential gloss image data 620 is also received as input data to the DFE 610 as well. The processed image as sent to the image output terminal (IOT) 630 is a binary image by halftoning the primary image 600 data as is normal. However, the halftone type selection is driven by the intended Glossmark™ image data 620 as input to multiplexer switch 640. The intended Glossmark™ image data 620 will serve to direct a portion of the primary image 600 to use a first anisotropic structured halftone while directing an alternative halftone to be used for the remainder of primary image 600. As will be understood by those skilled in the art, the intended Glossmark™ image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660, as dictated by the desired Glossmark™ data 620, to produce the composite result of raster input processed (RIP)

image data as passed to the IOT 630. In this way, a superimposition of a pattern 620 is imbedded into the primary image 600 which can only be perceived as a gloss differential Glossmark™ differential gloss image.

Figure 7:
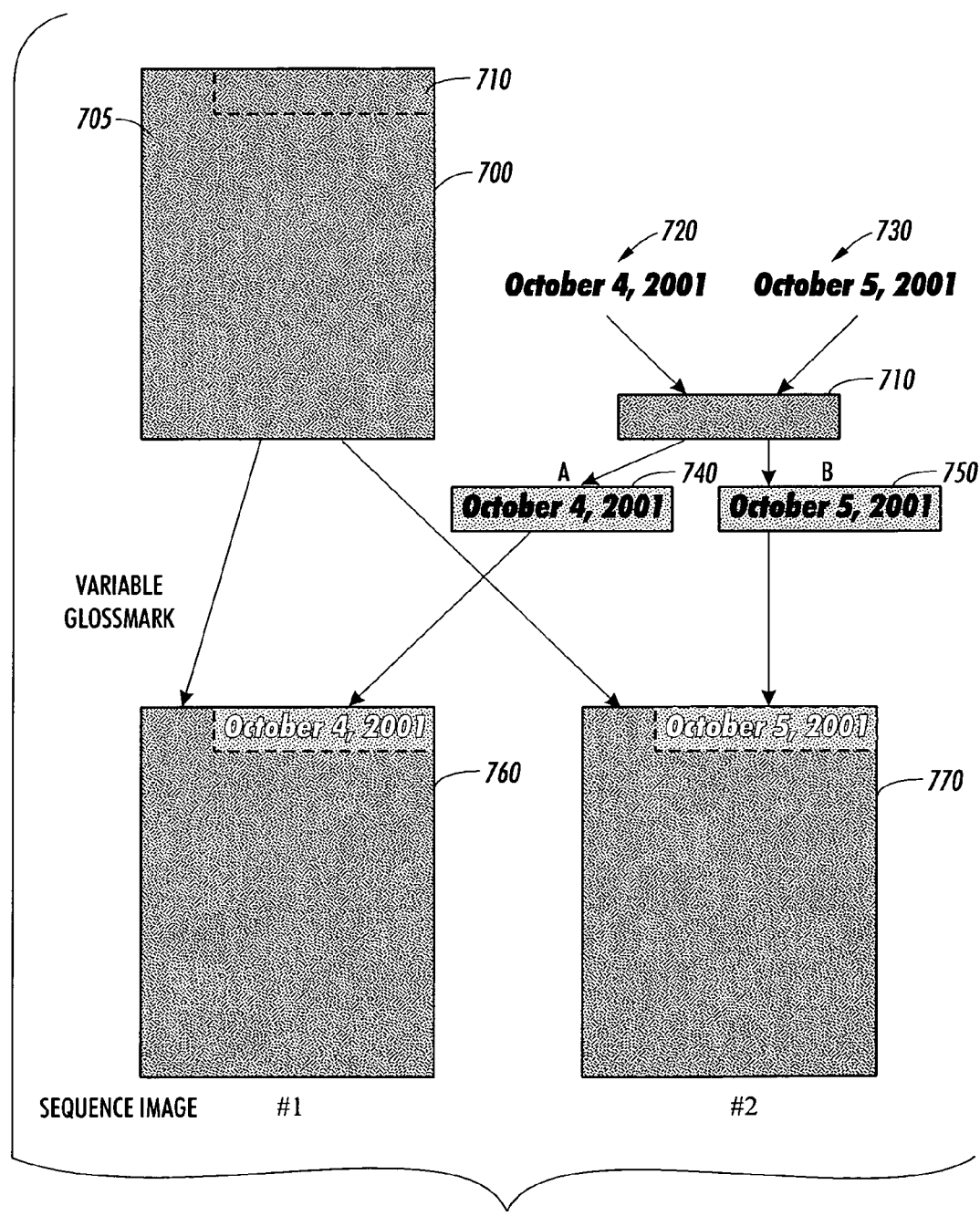
FIG. 7 depicts a visualization for the swapping of a small portion of an image of interest for a suitable variable glossmark image segment.

In the scenarios described above for variable Glossmark image generation, a large computational load is levied on the DFE, as will be understood by one skilled in the art in the following description. In FIG. 7, there is depicted the swapping of only a small segment of an image of interest 700 with a variable Glossmark™ differential gloss image segment 710. If only a small area of a given image of interest 700 is needed to satisfy the desire for Glossmark™ differential gloss imaging, the problems of increased processing time and memory storage overhead in the accommodation of Glossmark™ differential gloss images can be greatly ameliorated. There are many situations where only a small area of an image 700 is targeted for Glossmark™ imaging. For example, a date/time stamp is a very common and popular image adjunct. Having such information available in a manner which is less visually intrusive while viewing a desired image of interest is preferable and readily achieved by employing Glossmark™ imaging to the time/date stamp information. Utilization of variable Glossmark™ image segment 710 is of particularly attractive use when the data contained therein is ephemeral in nature or often changing. Other scenarios of such use is in accommodating serial numbers as Glossmark™ differential gloss images for either tickets or coupons; personalized information in mass mailings; and may include job processing/integrity numbers, bar-codes, company trademarks or logos. Glossmarking applied to such uses discourages falsification or fraud while serial numbers or other changing indicia allows for tracking. In general such usage scenarios as just provided above are generically referred to by those skilled in the art as "variable data".

As described in FIG. 7, the image of interest data 700 is segmented into a main area 705 and an image segment area 710. The main area 705 is conventionally halftoned with a first halftone having a first anisotropic structure orientation. However, for the image segment 710 the halftoning is performed as per the description provided above for FIGS. 5 and 6. The variable Glossmark™ image segment 710 utilizes the input data from image 700 corresponding to the segment area. This is utilized as the primary image data 610 to the DFE. The incoming flat binary variable Glossmark™ differential gloss image data, which for example A is "Oct. 4, 2001" 720 is utilized as the input to multiplexer switch 640. In this manner variable Glossmark™ image segment 710 is halftoned with both the first halftone having a first anisotropic structure orientation and a second halftone having a second anisotropic structure orientation. In this example, variable Glossmark™ differential gloss image data 740 is the result. In one embodiment, the area of segment 710 which is not to be overlaid by Glossmark™ data, i.e. the background, is halftoned with the first halftone type as used for main image area 700. In an alternative, the background is halftoned with a second halftone having a second anisotropic gloss structure orientation.

In a second example "B", as displayed in FIG. 7, the same image of interest data 700 and image segment 710 are employed. However, the variable Glossmark™ data 730 is "Oct. 5, 2001". The same methodology, as just described above, is employed again to result in variable Glossmark™ data 750 for this example. For both examples "A" & "B", the variable Glossmark™ images 740 and 750 are each independently merged with the halftoned main image of interest data 705 to create the respective sequence images 760 and 770. Thus, while FIG. 7 depicts only two Glossmark™ image date stamps by example, it will be apparent to those skilled in the art the technique may be applied for as many variable Glossmark™ differential gloss image segments as there is desire and storage available to accommodate.

However, there nevertheless remains one significant drawback in the teachings described just above relative to variable data scenarios, and that is that a Glossmark™ image must be computed on the fly or image data for a pre-computed Glossmark™ image must to be inserted into the document at print time. In variable data applications operating at high speed, for example a production color printer at 100 ppm, the performance impact for such an approach becomes an issue. Additionally, a further constraint in normal variable data applications, is that a large amount of data can not efficiently be pre-stored. For example, encoding a customer account number as a single entity would require a large amount of storage at the DFE level.

Heretofore, for the basic creation of variable data, Glossmark™ differential gloss image areas in a hardcopy page (as well as correlation marks in general) one needed to start by combining a primary image with a desired variable image data, provided as required in a Glossmark™ differential gloss image scenario, as binary mask data. In some portions of the image, as selected by the binary mask data, one halftone screen is used, and in other portions of the image, an alternate halftone screen is used. Thus, it is understood that two data channels need to be combined where one data channel controls the halftone cell structure and the other data channel delivers the image content. In standard a DFE (digital front-end), as provided in copiers, printers, multifunction devices, or digital presses, these channels are simply not available—nor is the IOT (image output terminal) access for the halftoning commonly accessible at this level—and thus a complete Glossmark™ differential gloss image or other correlation mark must be created off-line and inserted. This effectively impedes the ability for creation of variable data employing Glossmark™ differential gloss images, since all images must be computed external to the DFE and included as EPS (Encapsulated Postscript) etc. during rendering. This causes several problems in data flow, data handling, and data bandwidth. Described herein as follows below is an approach for solving this problem by restricting the variable data content to font strings (arbitrarily shaped single valued objects) thereby allowing the use of pattern color spaces as an alternate method for implementing variable data Glossmark differential gloss fonts.

In the present invention, no actual conventional halftoning is involved, but the two necessary substantially orthogonal anisotropic structures are combined inside the design of a standard font description. This font description is then used in the application and rendered with a color following standard PDL color rendering tools. In this way, the described arrangement is exemplary in that it can be implemented using standard variable data software, such as VIPP® (Variable Data Intelligence Postscript Printware) and other various document management software, such as FreeFlow™ and DocuSP®.

As explained above, in the creation of variable data, Glossmark™ differential gloss image, two different halftones are used employing the exact same color or gray tone. For a colored font element, this means that the element, say for example the letter "B" is rendered using a first anisotropic halftone structure and that the background area immediately around the letter is rendered using a second anisotropic halftone structure and that both structures are simultaneously encapsulated as a single entry in a font reference by the letter "B".

Figure 8:
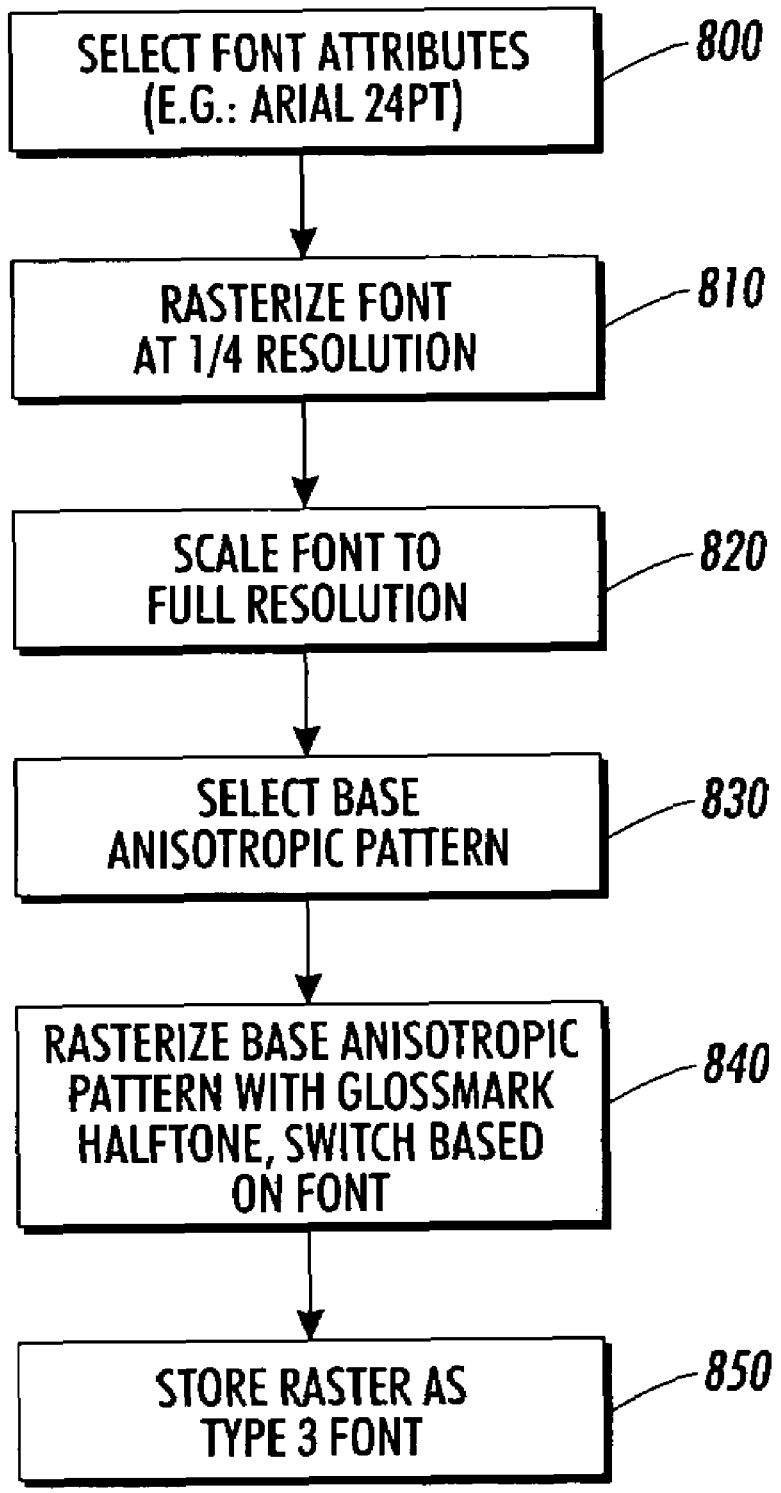
FIG. 8 depicts a process flow-chart representative of the teachings provided herein.

FIG. 8 provides a general outline of one procedure and methodology in keeping with the teachings provided herein. In a first step 800 an input font is selected. This is the font that will determine the general shape of the Glossmark™ differential gloss font image data. It should be noted, that in diffuse light no letter will be visible, rather a single "solid" area of color will be visible. Using a microscope or any other optical aid, the line separating the two anisotropic areas can be visualized and traced. Part of the selection mechanism for the gloss font is of course the proper selection of the desired font size as will be understood by those skilled in the art, since the final gloss font will be described by a bit accurate pattern as was used in early font work with dot matrix printers and the like. This is in clear distinction to current commonly employed technologies that incorporate so called outline fonts, thereby making the font transcription more portable between devices. This first step in a Glossmark™ differential gloss font design thus creates a bitmap representation of a specific input font at a specific size. It is understood by those skilled in the art that alternatively a complete bitmap design might be used as it was done in earlier font work. Converting an outline font to this bitmap representation, however, is a preferred initial step since it separates the font design for "beauty" from the necessary font design steps to needed to create a Glossmark™ font.

In the next step 810 the font selection is sub-sampled. This is achieved in one preferred embodiment example by rasterizing the font into a binary bit map form at a reduced resolution. This reduced resolution is directly related to the periodicity of the anisotropic structures. Here and in the description that follows, we will assume a periodicity of 8 and a reduction 4. Thus for example, for a 600 dpi target output system, the text will have to be effectively rendered at binary 150 dpi. The resultant bitmap 820 is now scaled back up to the desired full size, which in this embodiment means that it needs to be scaled up by a factor of 4 to yield the correct size, in this case to 600 dpi. This sub-sampling followed by up-scaling eliminates all fine details of the font, and creates a coarser representation of the font which thus enables getting all character outlines aligned with the placement of anisotropic structures that follows.

Figure 9:
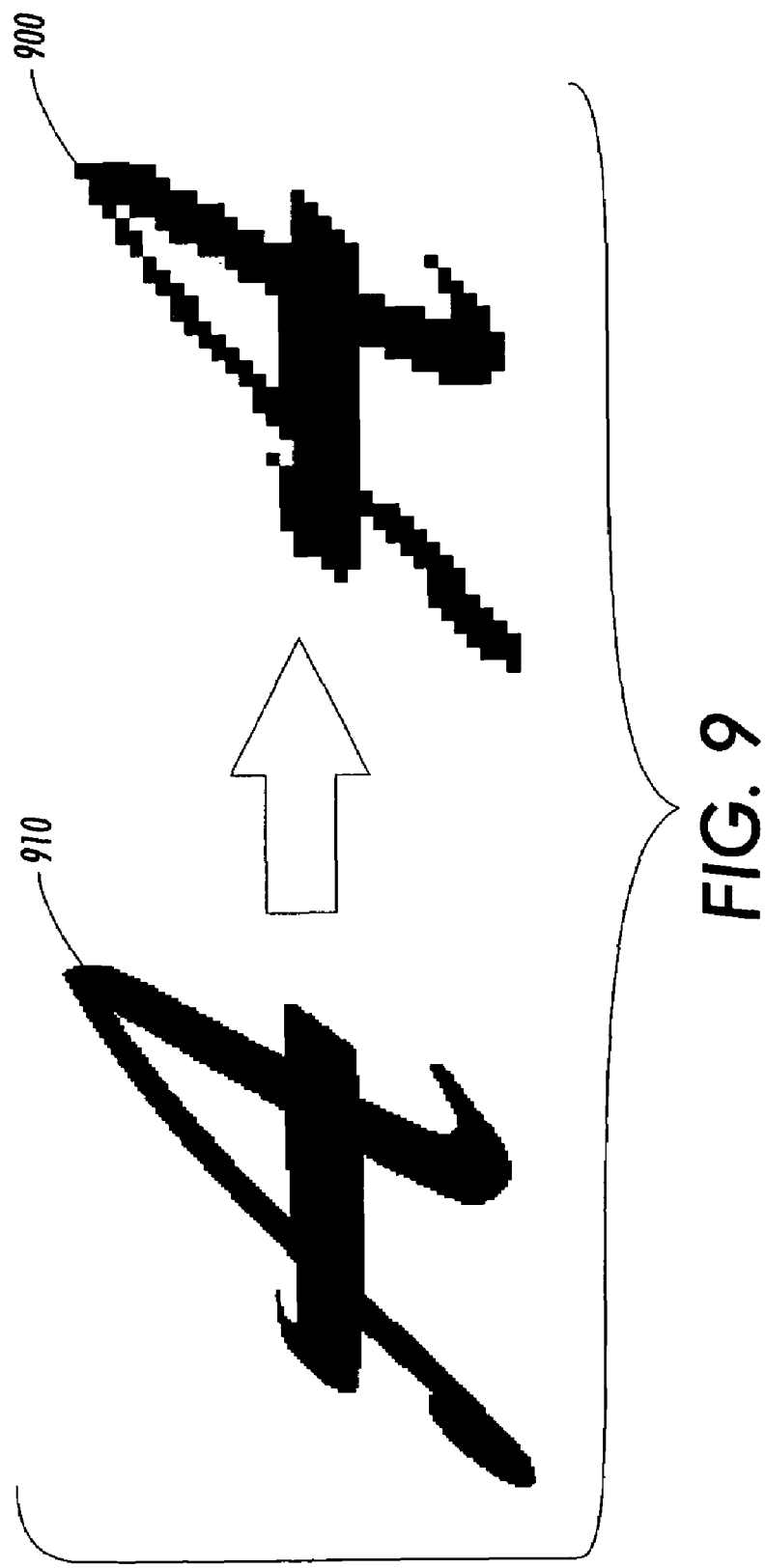
FIG. 9 depicts a font character and its one-quarter resolution scale version.

FIG. 9 shows a fully rendered sub-sampled font character 900 as compared to the scaled letter 910. Please note, that the alignment and transition between these anisotropic halftone cells is a common requirement of Glossmark™ halftone cell designs as described in the above listed applications previously incorporated by reference above. This ¼ resolution is based on actual preferred Glossmark™ halftone screen parameters, which in one typical preferred embodiment has a periodicity of "4". Other screen designs would require a different sub-sampling reduction scaling operation, e.g. a ⅓ to 3 scaling for a periodicity of "3" Glossmark™ differential gloss halftone screen.

The character 900 on the right of FIG. 9 is utilized to create a new bitmap as employed in a Glossmark™ differential gloss process. Returning now to the method flowchart depicted in FIG. 8, a base anisotropic pattern is selected 830, and then the rasterization step 840 creates a compound pattern of the two mutually substantially orthogonal anisotropic patterns, transitioning from one pattern to the other in accordance with the binary rastered input font symbol 900.

Figure 10:
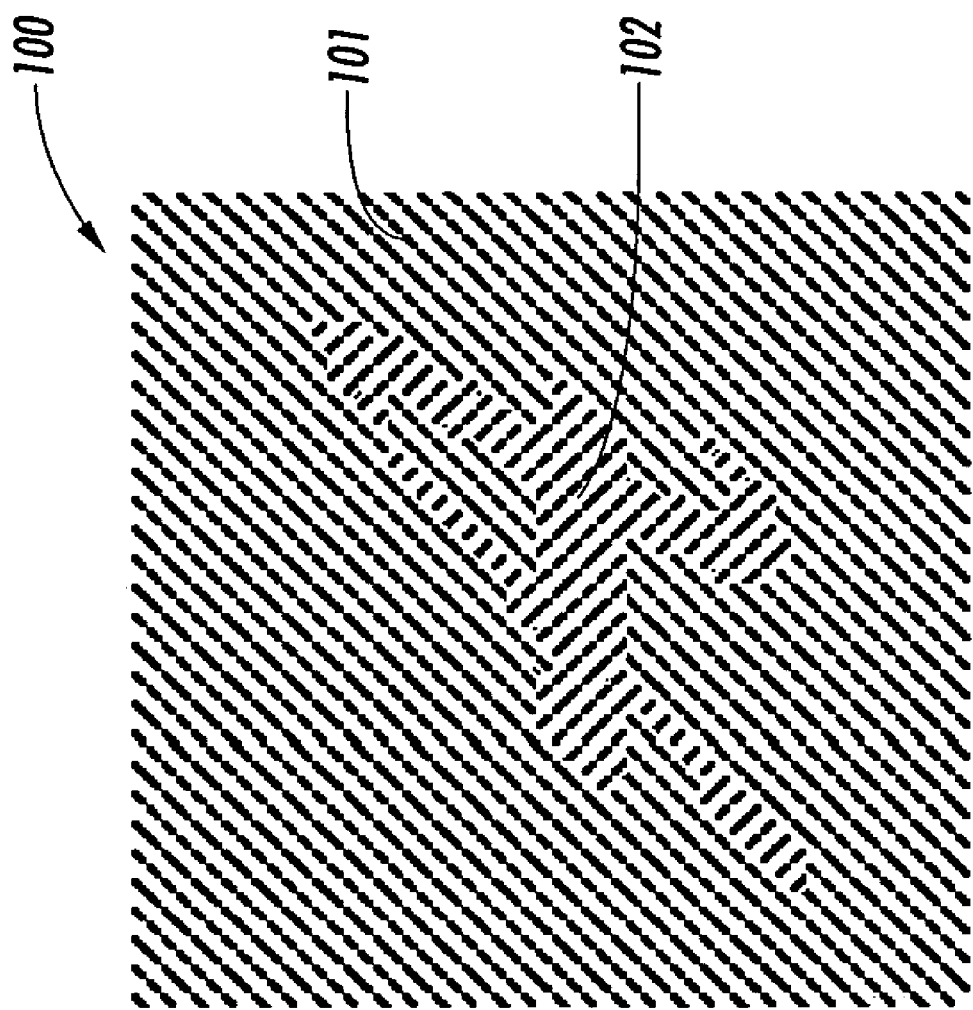
FIG. 10 shows one schematically depicted result of the teachings provided herein as employed to a font character.

A typical embodiment result 100 is schematically depicted in FIG. 10. What is distinctly different for the differential gloss font, as taught herein, from a conventional font representation, is that rendering is made of both the font character shape as well as its background field area. Conventional font representations provide rendering only of the font character shape, but not of the surrounding background field. Note that as provided in this FIG. 10 example embodiment, the background field area 101 outer boundary is rectangular, but as will be understood by one skilled in the art the outer boundary may be any number of different shapes or sizes, including oval, ellipsoidal, or substantially rectangular with arcuate corners. Into this background field area 101 a first anisotropic pattern is toggled and a second anisotropic pattern is toggled into the font character body shape 102 in accordance with the bit map provided by the binary raster input font symbol 900. This bitmap 100 is now stored 850 as the equivalent of the letter "A" as a new font that can be encapsulated, e.g.: as a type 3 PostScript™ font. The same procedure is performed for every other required or desired character element of the input font definition, thereby creating a new output gloss font that is a direct mapping of the input font. Note that when rendered or printed at actual resolution, the letter is not conventionally readable by the human eye, but substantially appears only as a gloss variation in directed light. It is, however, possible to trace the outline of the font letter using a microscope or equivalent visual aid, as mentioned previously above. Note also, that this rendering effectively fixes the resolution size of the font. This means that for example an Arial font rendered at 20 point might, due to integer pixel requirements and pixel accuracy provide a new gloss font at 21.35 point size. Also, in contrast to the standard Arial font that can be scaled to any size, e.g.: 12, 14 or 15 pt, the resultant gloss font must be used at the exact resolution and size specified in its creation.

The resultant new font can now be employed in one example methodology as a standard Type 3 font in any application, and preferably in any Variable Imaging application, such as VIPP. By virtue of being a binary bitmap font, exemplary advantage of the RIP caching can be obtained. This caching is commonly not enabled for fonts including color definitions. However, as will be understood by those skilled in the art, unlike more typical font representations, this font cannot be scaled. This means a new font type definition must be created for every desired font size. However, just like conventional fonts, this font can be used with an arbitrarily user selected standard color description that will be poured through the bitmap, including varying or patterned colors. Also exemplified by this method, is that it offers approximately a 5× processing speed advantage over other approaches. As a consequence however, no font transformations (scaling, rotation, etc.) can be accommodated.

The above method is an efficient and expedient way to create variable data differential gloss image hardcopy. The method is further exemplary in that it is compatible with currently existing workflows and hardware. It is also exemplary in that the methodology does not put an additional burden on the DFE, thus allowing full speed operation of the machine or print system. However, as will be appreciated by those skilled in the art, attention must be applied in the alignment of the variable data object data with respect to the pattern structure. (Note that alignment as discussed here refers to the transition areas between the two different screens that should be aligned with the cell boundaries—the pattern alignment of the foreground and background is automatically achieved as described above) Thus, it is desirable to use a bitmapped font that is downloaded to the DFE as taught above to avoid image artifacts. In this way, the string positions are more easily aligned with the cell pattern boundaries. This approach as provided herein limits some of the fine detail structures (serifs) in fonts that may be attained. However, these fine structures are not typically visually perceived in Glossmark™ differential gloss image hardcopy anyway, due to the limitations inherent in the human visual system.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for variable data differential gloss font image comprising:
   selecting a font character;
   sub-sampling the selected font character into a sub-sample result;
   scaling the sub-sample result back up to a desired full size result;
   selecting a first halftone cell having a first anisotropic structure orientation;
   selecting a second halftone cell having a second anisotropic structure orientation; and
   in a digital front end, applying the first halftone cell to the desired full size result and applying the second halftone cell to a background field for the desired full size result to produce a variable data differential gloss font image.

2. The method of claim 1 further comprising generating a complete gloss font set where the various enumerated steps of claim 1 are iterated for each desired derivative font character until each desired derivative font image is generated and assembled into a new complete gloss font set.

3. The method of claim 2 wherein the new gloss font is stored with a DFE for the DFE to render document strings and symbols.

4. The method of claim 2 where the gloss font set is encapsulated as a Type 3 font.

5. The method of claim 1 wherein the first anisotropic structure orientation and the second anisotropic structure orientation are 90 degrees apart.

6. The method of claim 5 wherein the second anisotropic structure has an orientation that can be achieved by mirroring the first anisotropic structure along one of the two scan directions.

7. The method of claim 3 wherein the first and second anisotropic structures are predominantly line type halftones.

8. The method of claim 6 wherein the first anisotropic structure has a 45 degree orientation to the right and the second anisotropic structure has a 45 degree orientation to the left.

9. The method of claim 1 wherein the first anisotropic structure orientation and the second anisotropic structure orientation are less than 90 degrees apart.

10. The method of claim 1 wherein the variable data differential gloss font image indicates addressee information.

11. The method of claim 10 wherein the variable data differential gloss font image indicates an addressee name.

12. The method of claim 1 wherein the variable data differential gloss font image indicates time information.

13. The method of claim 1 wherein the variable data differential gloss font image indicates date information.

14. The method of claim 1 wherein the variable data differential gloss font image indicates identification information.

15. The method of claim 14 wherein the variable data differential gloss font image indicates serial number information.

16. The method of claim 1 wherein the variable data differential gloss font image indicates monetary value information.

17. The method of claim 1 wherein the variable data differential gloss font image indicates job processing information.

18. The method of claim 1 wherein the variable data differential gloss font image indicates a bar-code.

19. The method of claim 1 wherein the variable data differential gloss font image indicates a trade logo.

20. A method for generating a variable text data differential gloss font image set comprising:
   selecting a font character;
   rasterizing the selected font character into a bit-mapped sub-sample result;
   scaling the sub-sample result back up to a desired full size bitmap result having a bit pattern defined therein;
   selecting a first halftone cell having a first anisotropic structure orientation;
   selecting a second halftone cell having a second anisotropic structure orientation;
   selecting a background field area suitable for encompassing the selected font character;
   in a digital front end, applying the selected first halftone cell and the second halftone cell to the selected background field area by toggling between the selected first and second halftone cells as dictated by the bit pattern in the desired full size bitmap result to create a differential gloss font character image; and,
   storing the created differential gloss font character image for utilization as system font.

21. The method of claim 20 wherein the background field area suitable for encompassing the selected font character is rectangular.

22. The method of claim 20 wherein the storing operation stores the differential gloss font character as a type 3 font.

23. The method of claim 20 wherein the two anisotropic halftone structures, are employed using a predetermined gray level.

24. The method of claim 20 wherein the two anisotropic halftone structures, are employed using a predetermined color level.

25. The method of claim 20 further comprising generating a complete gloss font set where the various enumerated steps of claim 20 are iterated for each desired derivative font character until each desired derivative font image is generated and assembled into a new complete gloss font set.

26. The method of claim 25 wherein the new gloss font is stored with a DFE for rendering document strings and symbols.

* * * * *